(12) United States Patent
Huang

(10) Patent No.: US 7,455,512 B2
(45) Date of Patent: Nov. 25, 2008

(54) MOLD ASSEMBLY FOR MANUFACTURING HEAVY DUTY PLASTIC HOLLOW BOARD

(76) Inventor: Jung-Tsao Huang, P.O. Box 36-80, Taichung City (TW)

( * ) Notice: Subject to any disclaimer, the term of this patent is extended or adjusted under 35 U.S.C. 154(b) by 101 days.

(21) Appl. No.: 11/452,060

(22) Filed: Jun. 13, 2006

(65) Prior Publication Data

US 2007/0286990 A1  Dec. 13, 2007

(51) Int. Cl.
 *B29C 49/48* (2006.01)
(52) U.S. Cl. .................................. 425/525; 425/522
(58) Field of Classification Search ................. 425/522, 425/525, 324.1, 527, 531, 289, 296; 264/296, 264/531, 534
See application file for complete search history.

(56) References Cited

U.S. PATENT DOCUMENTS

| 4,715,473 | A | * | 12/1987 | Tschudin-Mahrer | ......... | 181/286 |
| 6,060,163 | A | * | 5/2000 | Naaman | ..................... | 428/397 |
| 6,103,163 | A | * | 8/2000 | Joppen et al. | ............ | 264/210.2 |
| 6,592,358 | B2 | * | 7/2003 | Iwasaki | ...................... | 425/525 |

FOREIGN PATENT DOCUMENTS

| JP | 06134842 A | * | 5/1994 |
| JP | 2000043541 A | * | 2/2000 |

* cited by examiner

*Primary Examiner*—Robert B Davis
(74) *Attorney, Agent, or Firm*—Charles E. Baxley

(57) ABSTRACT

A heavy duty plastic hollow board and a mold assembly for manufacturing the same, wherein the plastic board is made through an integrated molding process and the exterior thereof is integrally closed to contain an inward space with a plurality of strengthening ribs; wherein the mold assembly for manufacturing said board comprises a first mold, a second mold, cavities respectively arranged on the opposite surfaces of both molds, a movable mold arranged associated to the outer surface of the second mold which is movable for a predetermined distance from the second mold; a plurality of rib-forming members of the movable mold to be received by a plurality matching through holes of the second mold. As the movable mold approaches and is combined with the second mold, the rib-forming members thread through the through holes and appear in the cavity of the second mold. Thereagainst, while the movable mold leaves the second mold, the rib-forming members completely depart from said cavity.

8 Claims, 12 Drawing Sheets

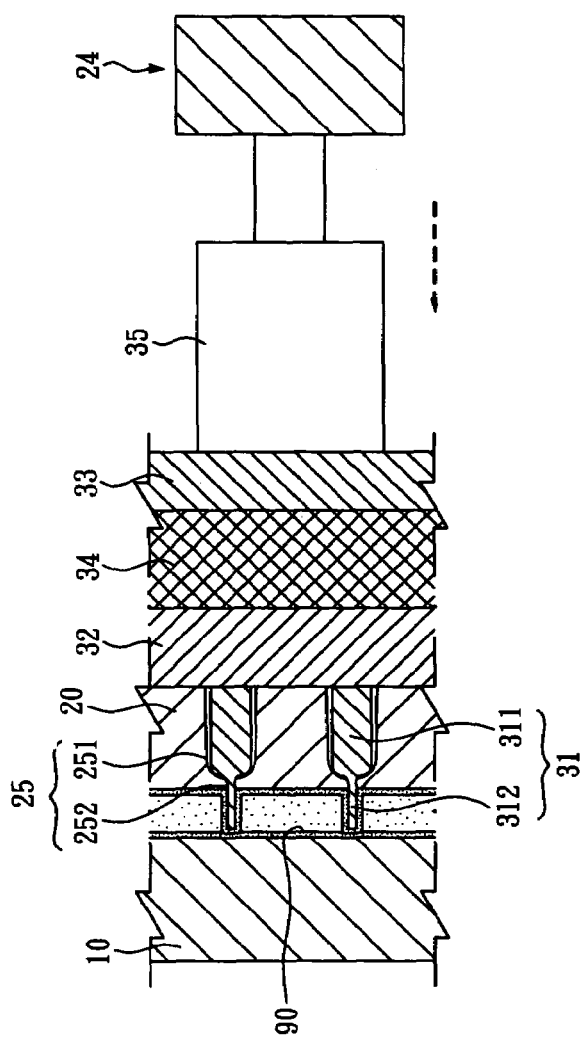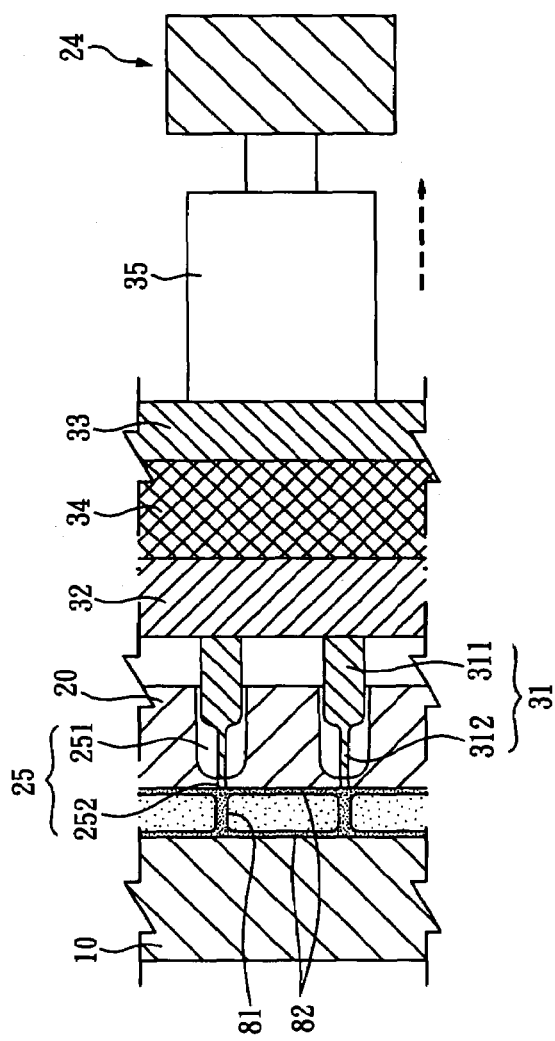

MOLD ASSEMBLY FOR MANUFACTURING HEAVY DUTY PLASTIC HOLLOW BOARD

BACKGROUND OF THE INVENTION

1. Field of the Invention

The present invention relates to a heavy duty plastic hollow board and a mold assembly for manufacturing the same. More particularly, the hollow board is characterized by an integrally sealed exterior which contains an enclosed space with a plurality of strengthening ribs therein.

2. Description of Related Art

Plastic board is a material providing extensive usages. Generally, in prior arts (as shown in FIG. 1), for reducing the weight, advancing the structural strength and increasing the load capacity of a plastic board with a determined thickness, a plurality of fillisters may be applied on either major surface of the board. The spaced fillisters substantially facilitate reducing the weight of the entire board and relatively define protruding ribs which contribute to the structural strength and load capacity thereof. However, the resultant corrugated surface is, not exteriorly aesthetic in a way and consequently, the opposite plane surface thereof is usually taken as the only applicable surface. Such a limit of application is disadvantageous and uneconomical. Thus, a need exists for a plastic board with an integrally even exterior and the advantages of light weight, firm structure as well as heavy load simultaneously. It may be accomplished through a structure consisting of an integrated surface and an enclosed space with a plurality of strengthening ribs contained therein, yet such an optimal plastic board is not achievable by means of conventional one-piece-forming technique.

SUMMARY OF THE INVENTION

The present invention has been accomplished under the circumstances in view. It is one object of the present invention to provide a mold assembly for manufacturing foresaid optimized plastic board.

A mold assembly for manufacturing a heavy duty hollow plastic board substantially comprises:

a first mold with a mold cavity on the inner surface thereof;

a second mold aligned opposite to the first mold also having a mold cavity on its inner surface facing the first mold;

a movable mold associated to the second mold which is movable for a predetermined distance from the outer surface of the second mold and is having a plurality of protruding rib-forming members corresponding to a plurality of through holes provided on the second mold and to be received therein; and as the movable mold coming into close proximity with the second mold, the rib-forming members piercing the through holes and appearing in the cavity of the second mold; while the movable mold leaving the second mold, the rib-forming members completely isolated from said cavity.

The mold assembly provided by the present invention may used to form a particular heavy duty hollow plastic board with an integrally one-piece exterior which contains an inner space and a plurality of strengthening ribs contained therein.

It is another object of the present invention to produce a plastic board with an integrated surface which contains an inner space and a plurality of strengthening ribs therein by means of foresaid mold assembly.

Furthermore, the plastic board of the present invention has an artistic and desirable integral external, enclosed inner space for reducing the weight of the board and strengthening ribs for enhancing the structure and load.

BRIEF DESCRIPTION OF THE DRAWINGS

The novel features believed characteristic of the invention are set forth in the appended claims. The invention itself, however, as well as a preferred mold of use, further objects and advantages thereof, will best be understood by reference to the following detailed description of an illustrative embodiment when read in conjunction with the accompanying drawings, wherein:

FIG. 9 is the sectional view taken in an enlarged scale along line 9-9 of FIG. 7.

FIG. 10 is the sectional view taken in an enlarged scale along line 10-10 of FIG. 8.

DETAILED DESCRIPTION OF THE PREFERRED EMBODIMENT

Figure 1:
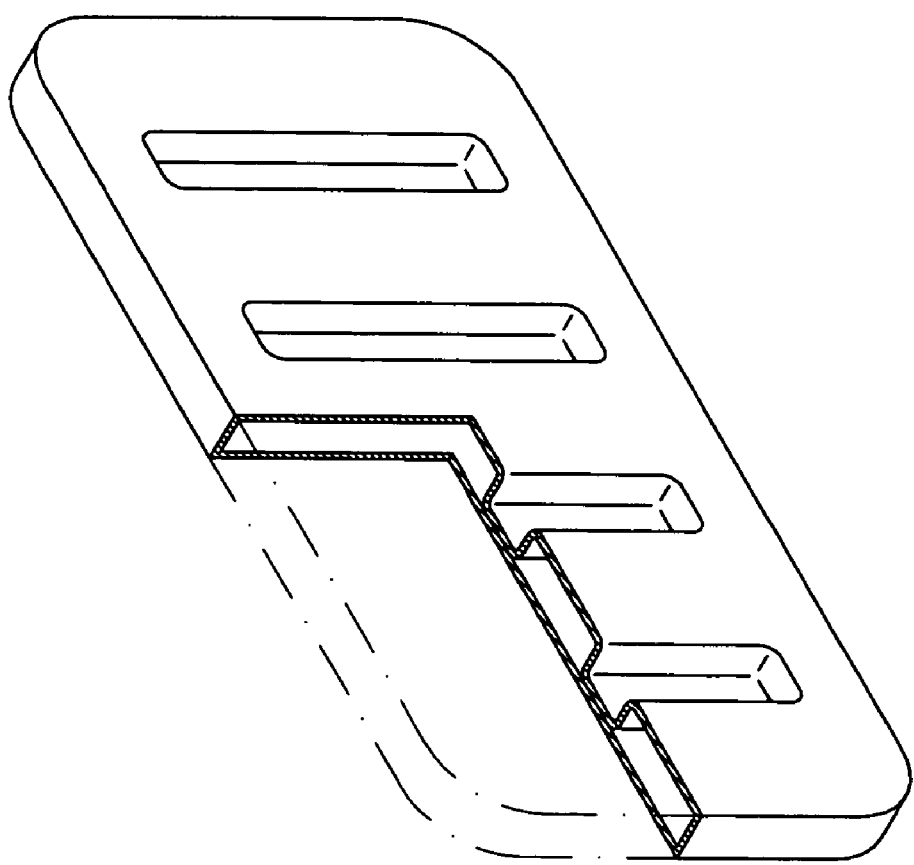
FIG. 1 is a schematic perspective drawing of a conventional plastic board.
Figure 2:
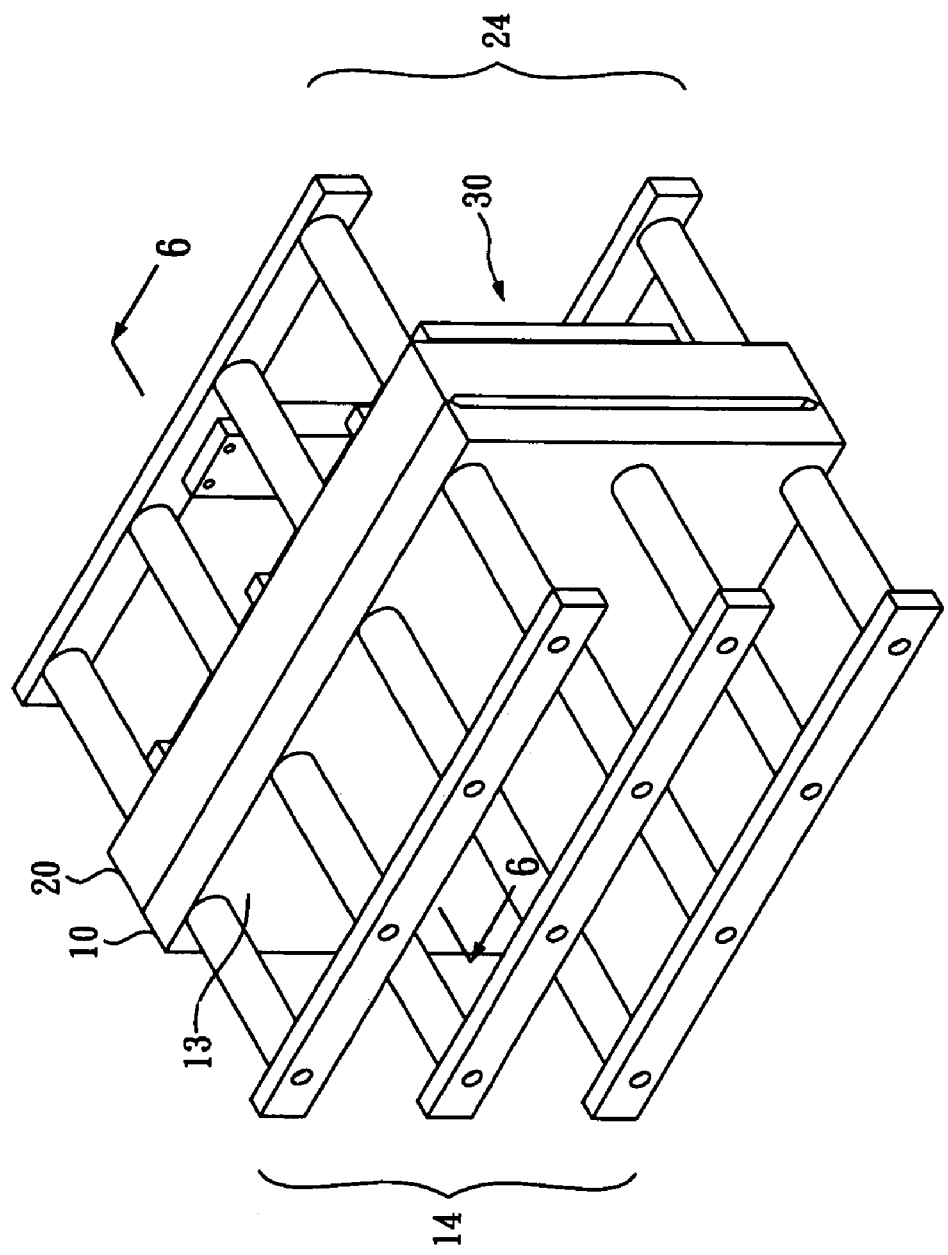
FIG. 2 is an oblique front elevation of a mold assembly according to the present invention.
Figure 3:
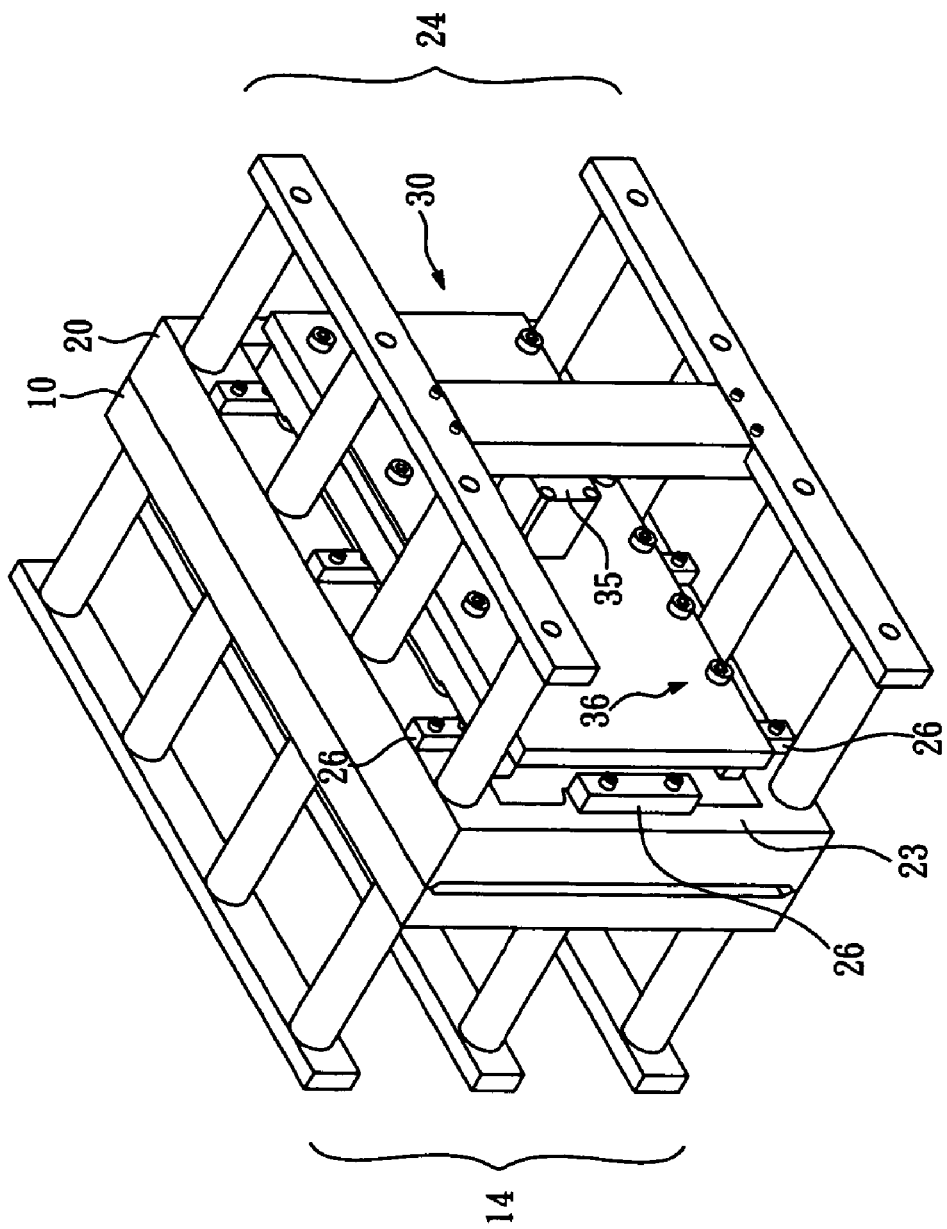
FIG. 3 is an oblique rear elevation of a mold assembly according to the present invention.
Figure 4:
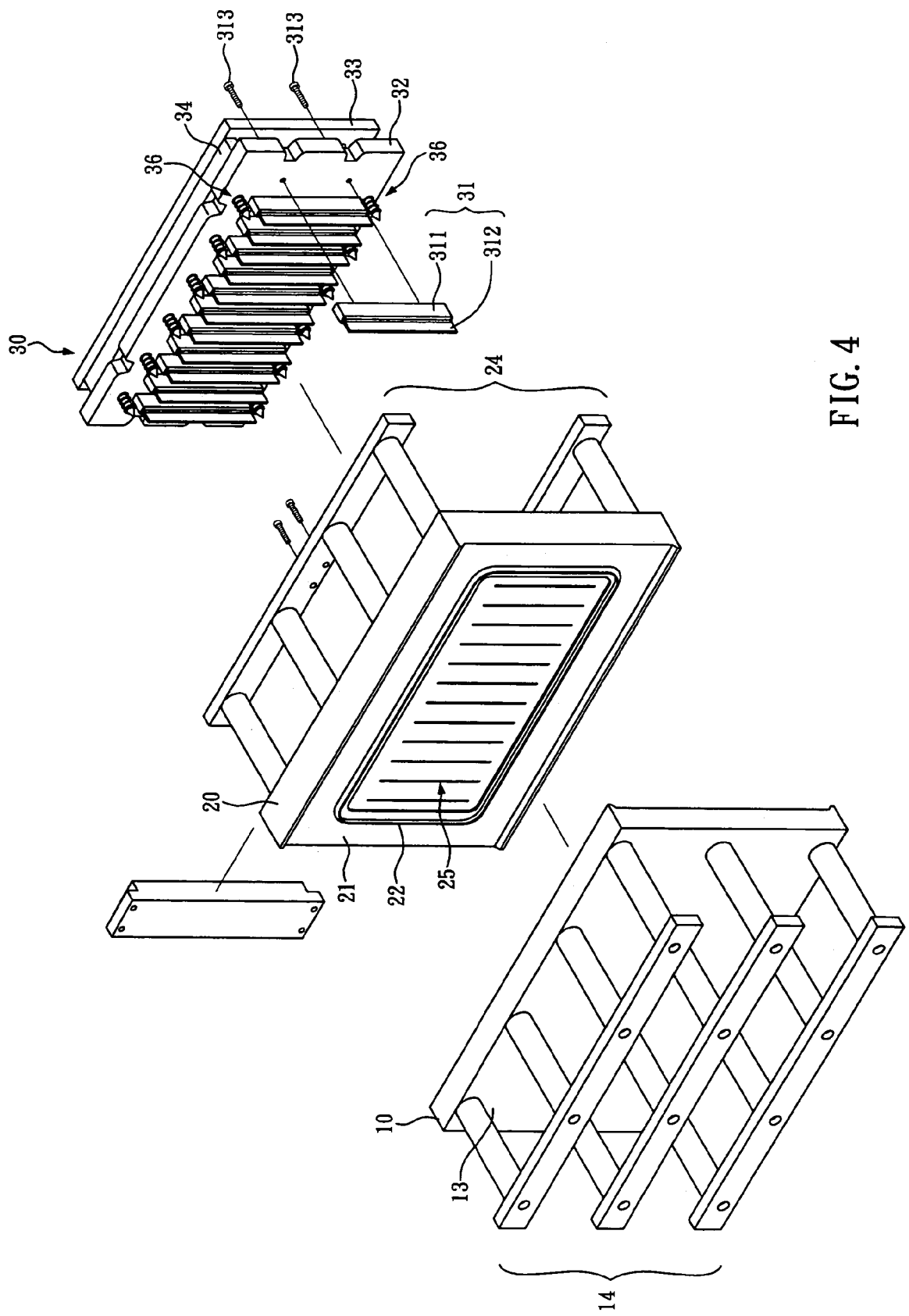
FIG. 4 is the exploded view of a mold assembly according to FIG. 2.
Figure 5:
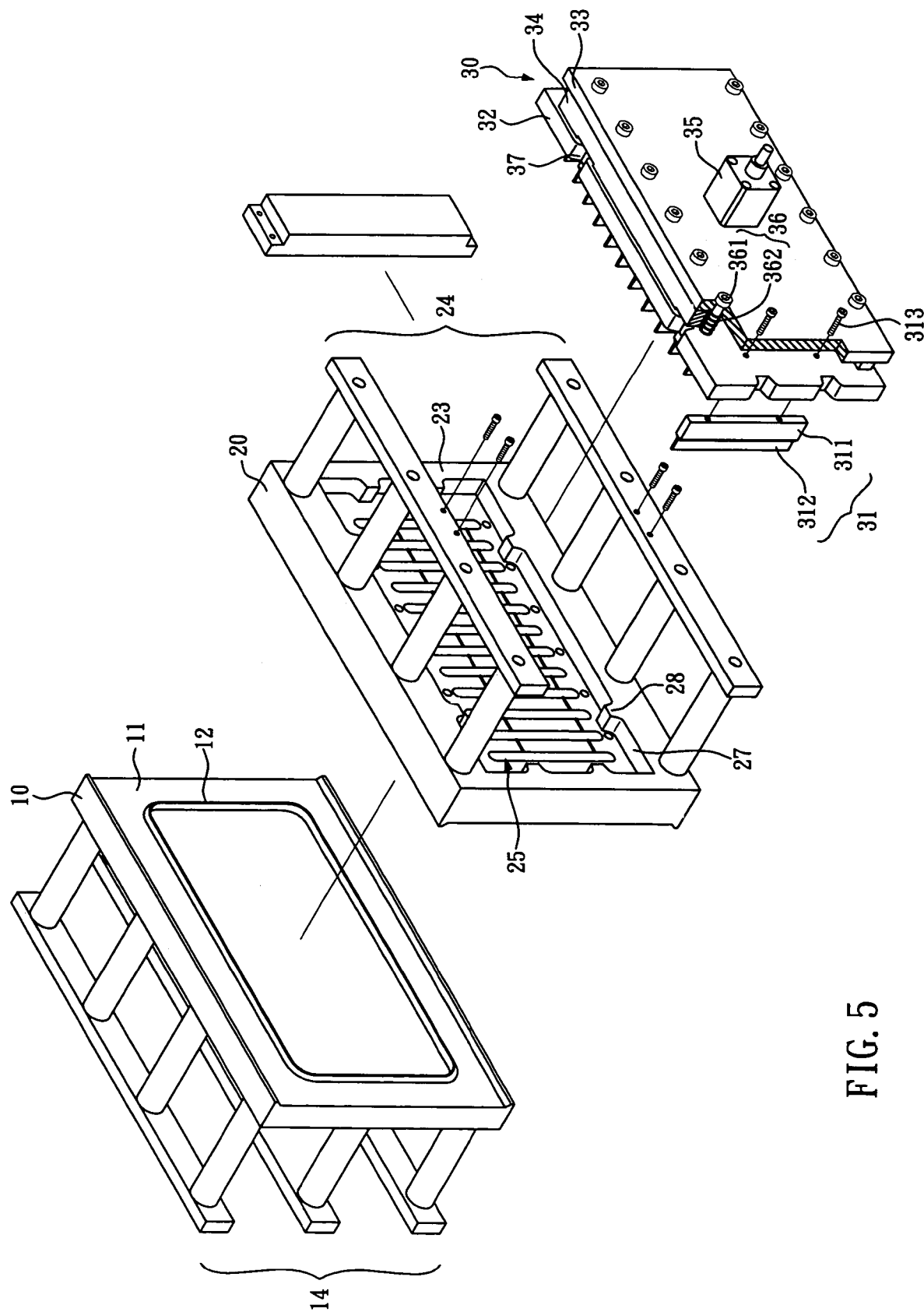
FIG. 5 is the exploded view of a mold assembly according to FIG. 3.

As shown in FIGS. 2 to 5, the mold assembly according to the present invention primarily comprises:

a first mold 10 with a mold cavity 12 on the inner surface 11 thereof;

a second mold 20 aligned opposite to the first mold 10 also having a mold cavity 22 on its inner surface 21 facing the first mold and while the first and second molds 10, 20 engage mutually, the cavities 12, 22 thereof jointly define a forming space; and a movable mold 30 associated to the outer surface 23 of the second mold 20 which is movable for a predetermined distance from the second mold 20 and is having a plurality of protruding rib-forming members 31 corresponding to a plurality of through holes 25 provided on the second mold 20 and to be received therein. When the movable mold 30 comes into close proximity with the second mold 20 under control, the rib-forming members 31 pass through the through holes 25 and pierce into the cavity 22 of the second mold 20. On the contrary, while the movable mold 30 moves reversely to be distant from the second mold, the rib-forming members 31 are completely isolated from said cavity 22.

Figure 6:
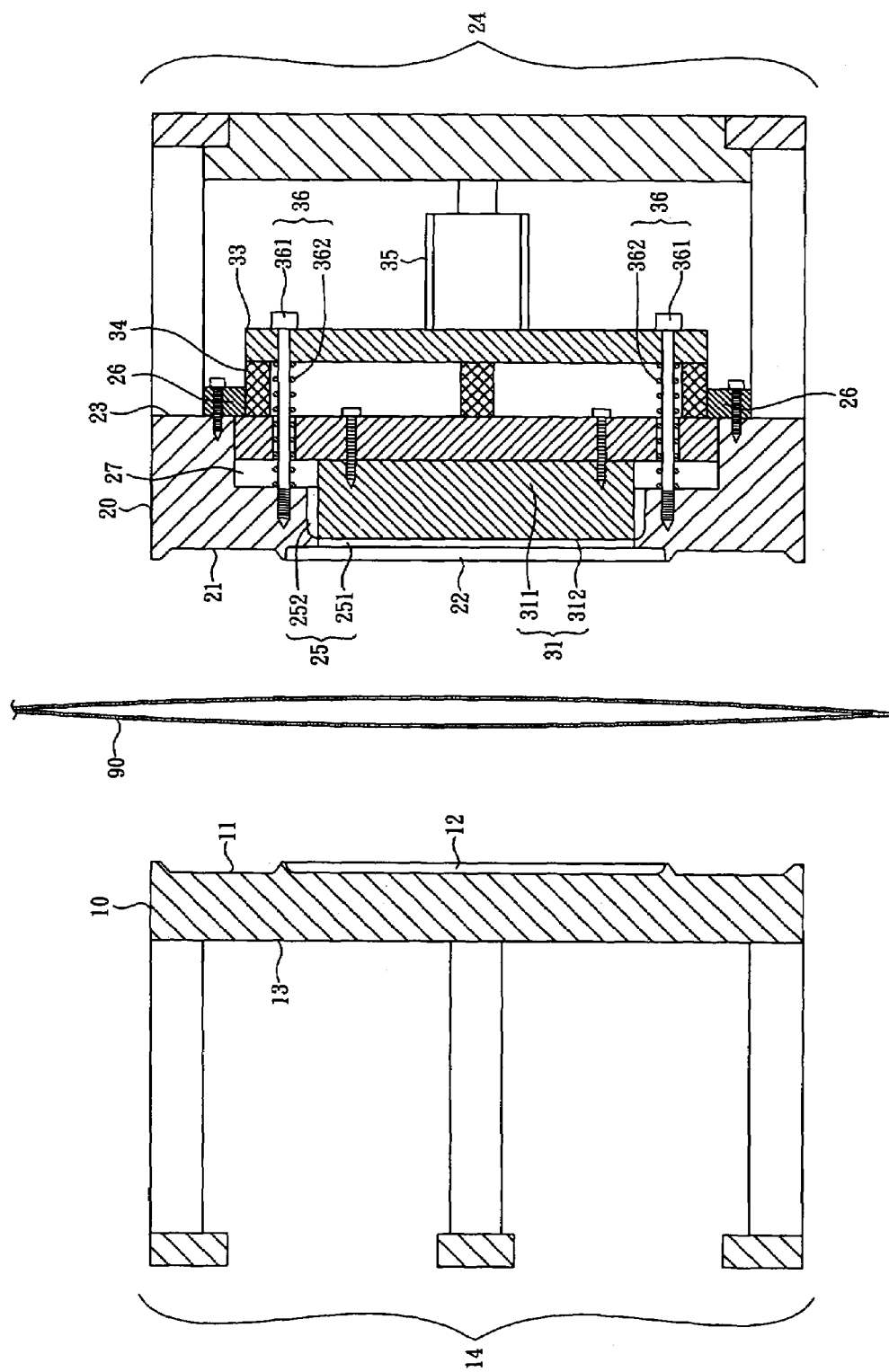
FIG. 6 is the sectional view taken in an enlarged scale along line 6-6 of FIG. 2.
Figure 7:
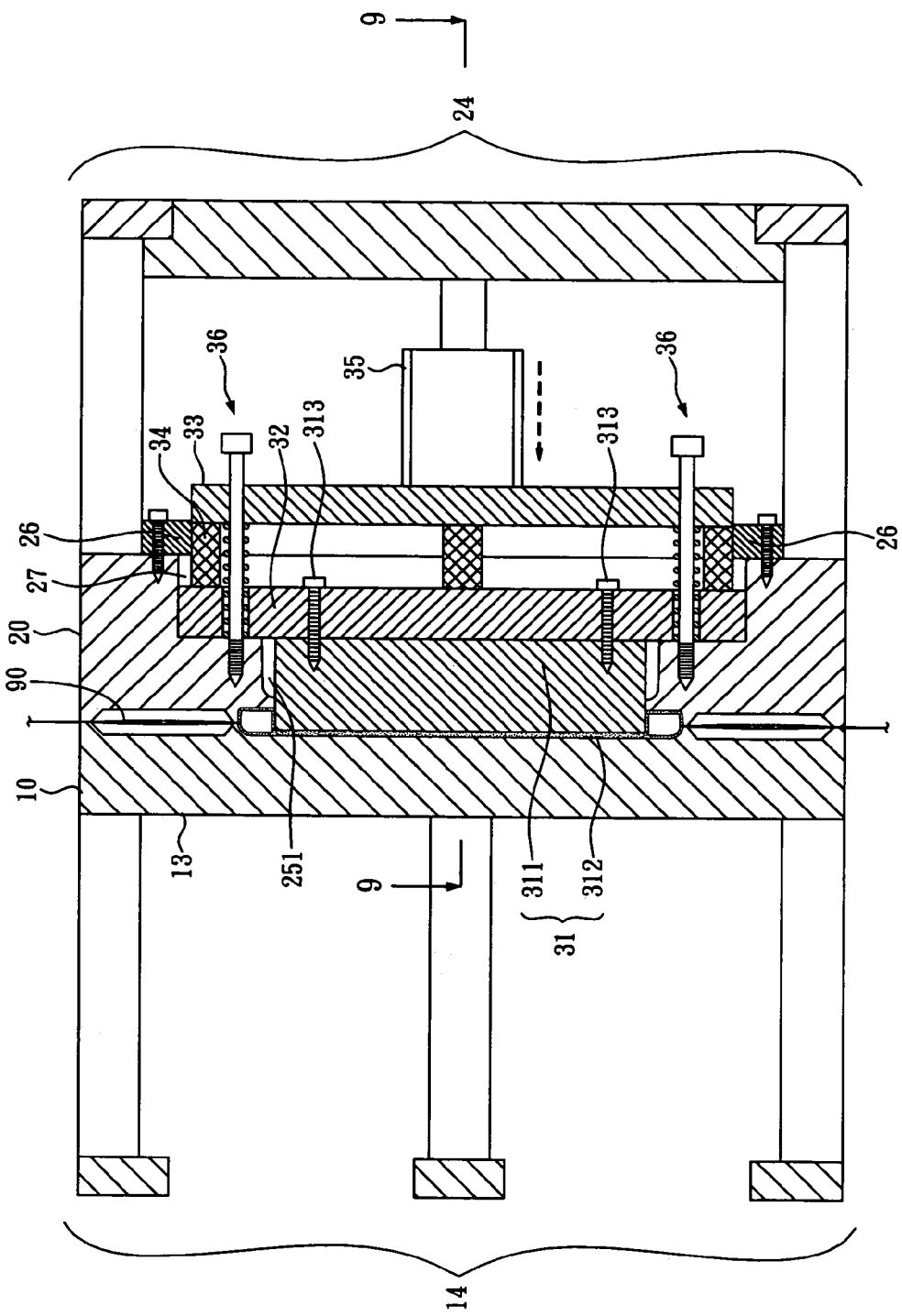
FIG. 7 is the schematic drawing showing mold assembly assembled according to FIG. 6.
Figure 8:
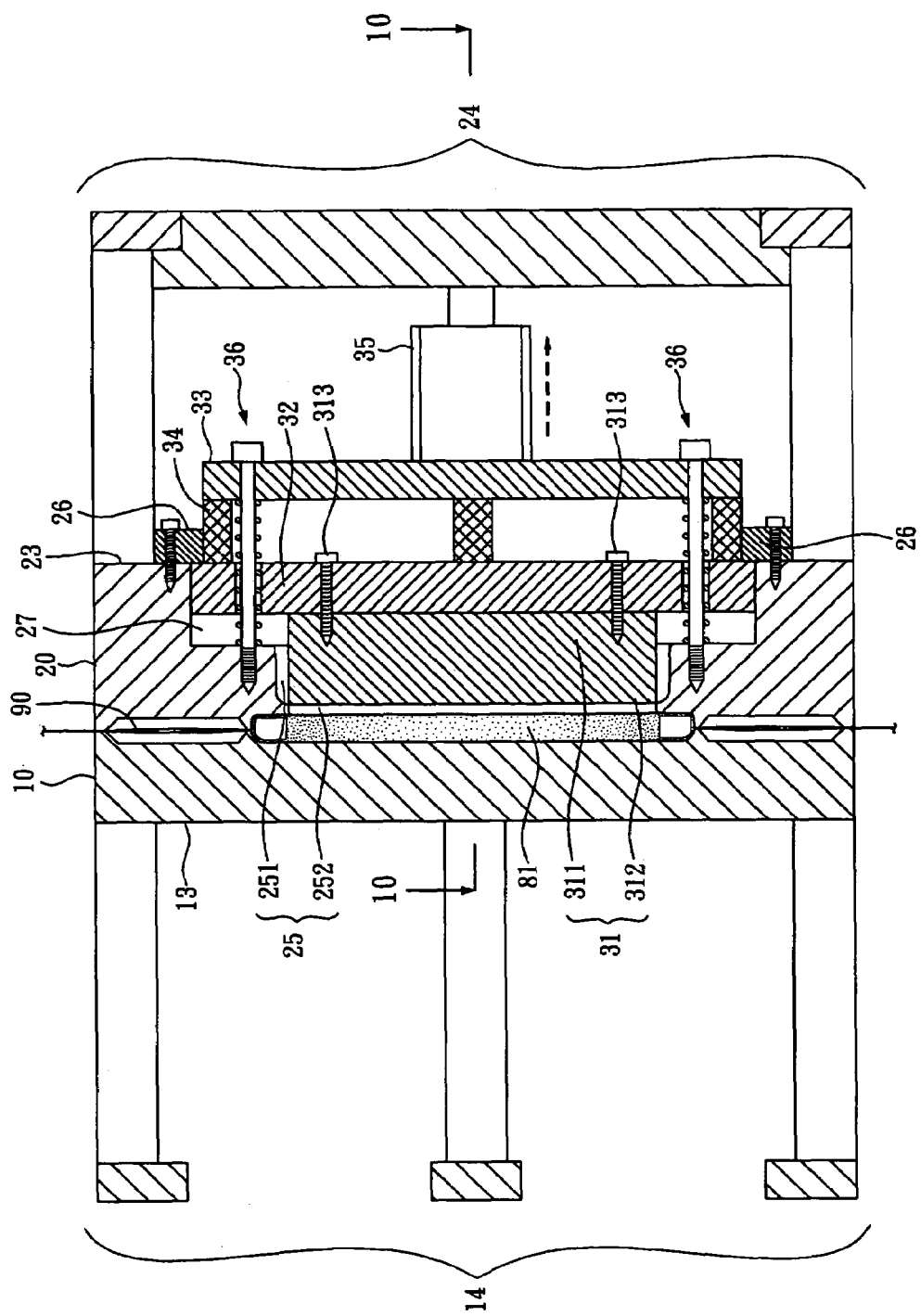
FIG. 8 is the schematic drawing showing mold assembly disassembled according to FIG. 7.
Figure 11:
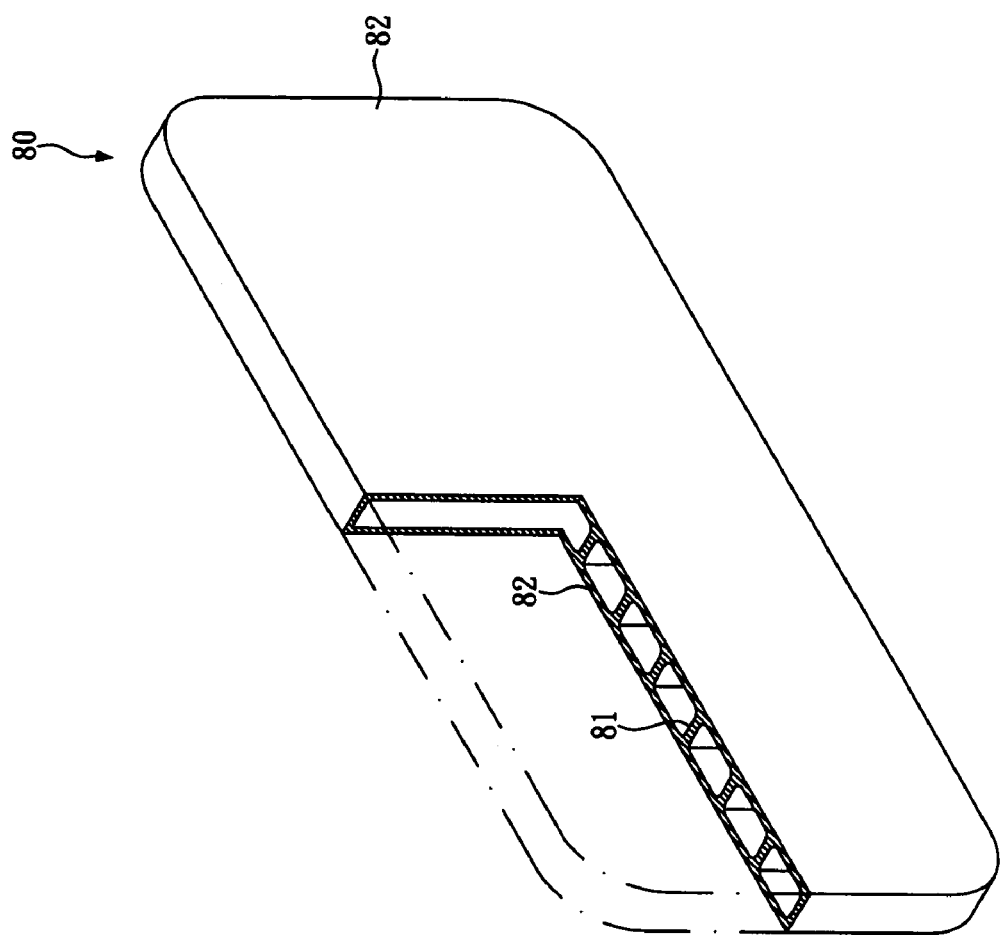
FIG. 11 is a schematic drawing of a plastic board according to the present invention showing part cross-section.

The main technical manner for manufacturing discussed optimal plastic board with the mold assembly of the present invention is illustrated through FIGS. 6 to 10. In FIG. 6, a plastic film tube 90 is placed between separated first and second molds 10, 20. Referring to FIGS. 7 and 9, where the first and second molds 10, 20 get engaged mutually, the rib-forming members 31 of the movable mold 30 pierce into the cavities 12, 22 of the first and second molds 10, 20. At this time, means of heating and high-pressure air blowing are implemented to inflate said plastic film tube to fill up the forming space defined jointly by cavities 12, 22 and therefore reform the film along the contours of the cavities 12, 22 and each rib-forming member 31. As shown in FIGS. 8 and 10, when the movable mold 30 subsequently retreats expeditiously under control, since the plastic film is still flexible thereat, film surrounding the rib-forming members 31 is compressed toward the axis of each rib-forming member 31 due to the effect of said high-pressure air and is formed as solid strengthening ribs 81 and, thereby, the surface 82 of the resultant plastic board is completely sealed. Thereupon, when the shaped plastic product 80 is released from the molds after a predetermined time, as shown in FIG. 11, it is formed of a most preferable type which has integrally sealed surface 82, contained inner space and a plurality of strengthening ribs 81.

What described above is related to the main technical manner taken by the present invention while the detailed measures are given hereinafter.

As shown in FIGS. 2 to 5, back brackets 14, 24 respectively support the first and second molds 10, 20 at the outer surfaces 13, 23 thereof and are associated to mold-closing apparatus (not shown).

As to the movable mold 30, in one embodiment of the present invention, it comprises a first plate 32 and a second plate 33 which are remotely associated and spaced at an interval by a plurality of distance pieces. Devices for driving the movable mold 30 to and fro comprise: a linear actuator 35 attached to the rear of the movable mold 30 and a plurality of spring assemblies 36 which are distributed extensively and evenly on the front of the movable mold 30. While the linear actuator 35 provides thrust to push the movable mold 30 towards the second mold 20, the spring assemblies 36 provide an integrated restoring force opposite to said thrust. Moreover, as the spring assemblies 36 suffuse the front of the movable mold 30, the relatively more powerful restoring force facilitates said expeditious retreat of the movable mold 30. Each spring assembly 36 includes a bolt 361 fixedly fasten to the movable mold 30 and receivable by the second mold 20, and a spring 362 which envelops the bolt 361 while the both ends, respectively butt on either the second mold 20 or the movable mold 30. In the discussed embodiment, the linear actuator 35 is a cylinder with a shaft thereof fixed on the back bracket 24. When the linear actuator 35 thrusts the movable mold 30 approaching the second mold 20, the springs 362 are compressed and thus storage energy. Once the linear actuator 35 stops acting on the movable mold 30, the springs 362 rebound simultaneously and thereby reposition the movable mold 30 expeditiously.

The second mold 20 further comprises a back-trough 27 for detachablely receiving said first plate 32 of the movable mold 30, wherein the peripheral contacting surfaces of either the back-trough 27 or first plate 32 have either notches 37 or coupling salients 28 to be engaged mutually. By the limit defined by the back-trough 27 as well as the engagement of the notches 37 and salients 28, the movable mold 30 is therefore mounted to and dismounted from the second mold 20 stably and steady.

To set a moving limit of the movable mold 30, in the embodiment, some retainers 26 are disposed on the rear of the second mold 20 for retaining the movable mold 30 when it arrives at a limit position where the rib-forming members 31 are completely withdrawn from the cavities 12, 22.

The rib-forming members 31 may be detachablely attached to the movable mold 30. In an alternative embodiment of the present invention, each rib-forming member 31 comprises a socket 311 screwed on the front surface of the movable mold 30 and an inserting piece 312 further mounted thereon. Hence, any invalid rib-forming member 31 may be replaced individually.

The through holes 25 of the second mold 20 for accommodating the rib-forming members 31 may vary from different shapes of the rib-forming members 31. In the embodiment, socket seats 251 and inserting piece slots 252 are provided to receive the sockets 311 and inserting pieces 312 respectively.

Foregoing detailed descriptions of the present invention can be seen clearly in FIGS. 6 to 10. In FIGS. 7 and 9, the first and second molds 10, 20 are engaged mutually. When the linear actuator 35 drives the movable mold 30 approaching the second mold 20, the sockets 311 eventually rest in the socket seats 251 and the inserting pieces 312 pierce through the inserting piece holes 252 into the cavities 12, 22 of the first and second molds 10, 20. Simultaneously, the springs 362 of the spring assemblies 36 are compressed and thereby storage the compressing energy. Thereat, the high-pressure air blowing is conducted to contour said plastic film 90 along the peripheries of the cavities 12, 22 and inserting pieces 312 and thereupon a plastic product is gradually formed.

As referred to FIGS. 8 and 10, while the plastic product begins to transit from flexible into rigid, the linear actuator 35 leaves off the thrust acting on the movable mold 30 and all the released springs 362 of the spring assemblies 36 rebound concurrently to disperse the movable mold 30 form the second mold 20 instantly. Since the plastic film 90 is still flexible thereat, the effect of said high-pressure gas therefore compress the film around each rib-forming member 31 toward the longitudinal axis thereof to form an inner strengthening rib 81 and thereby seal the surface 82 of the plastic product 80.

In FIG. 11, the plastic product 80 that released from the molds after a preset time presents an appearance as having an integrally closed surface 82 containing an enclosed space with a plurality of strengthening ribs 81. Such a product therefore gives a pleasing and desirable exterior while the inner space reduces the weight and the strengthening ribs 81 enhance the strength thereof.

Figure 12:
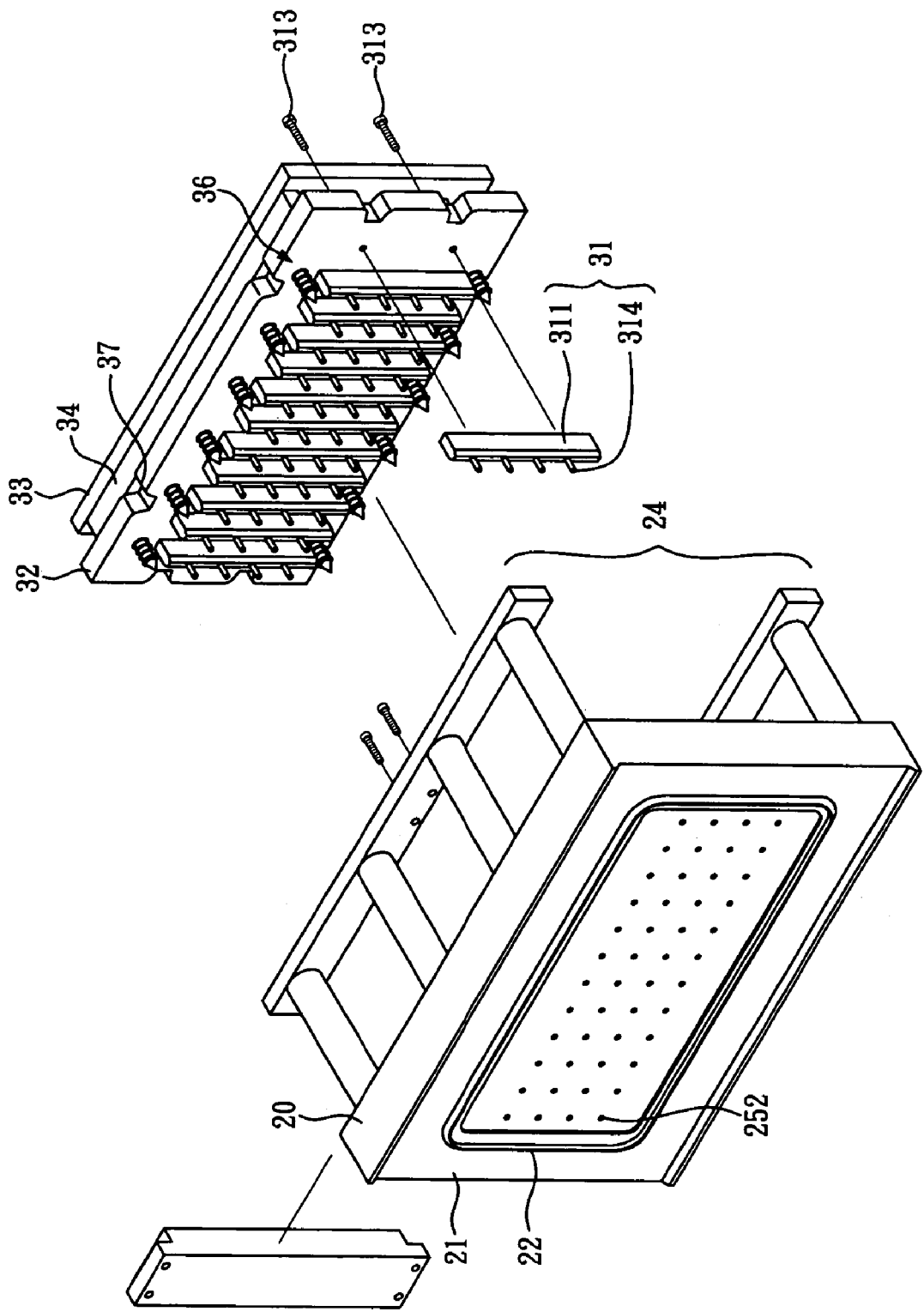
FIG. 12 is an exploded view of a movable mold with column-shaped inserting pieces and a second mold having round through holes according to the present invention.
Figure 13:
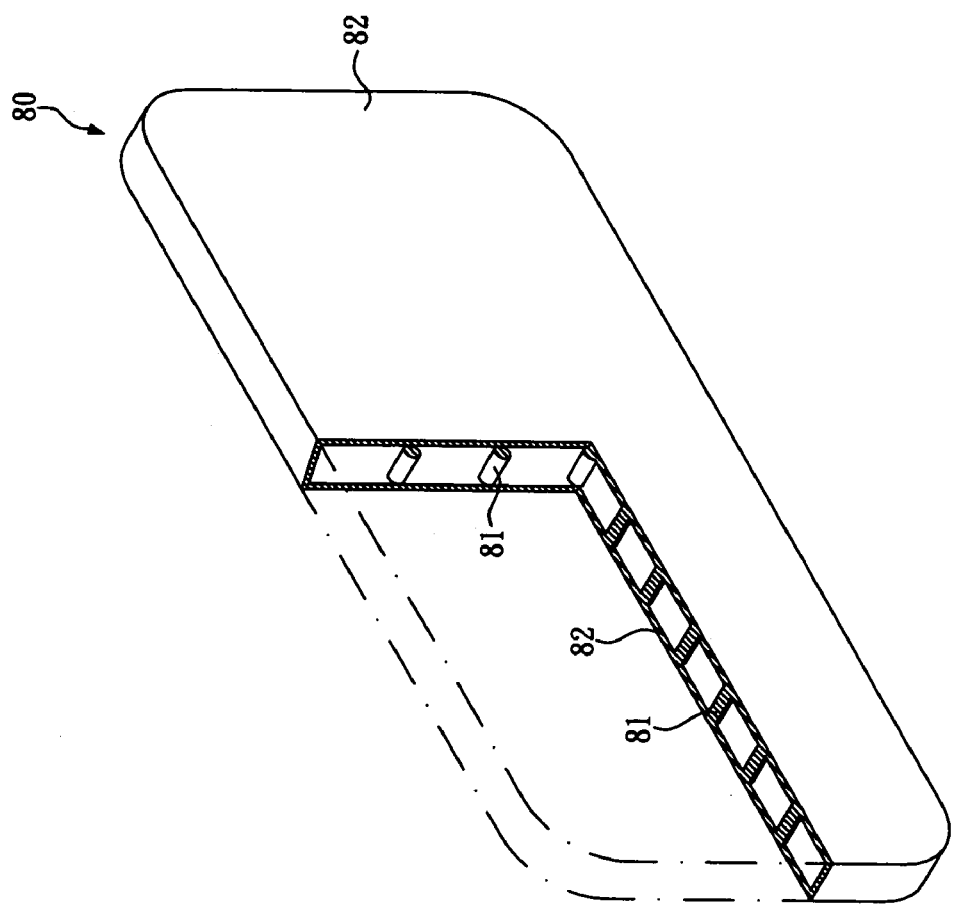
FIG. 13 is a schematic drawing of a plastic board formed by the molds of FIG. 12 showing part cross-section.

Note that the inserting pieces 312 of the rib-forming members 31 on the movable mold 30 of the present invention is not only limited to the embodiment described hereinbefore, and various changes and modifications may be applied for different needs. As shown in FIG. 12, the inserting pieces 314 are designed as an array of columns and the through holes 25 on the second mold 20 are matching round holes. Thus, a product 80 made thereout has the encapsulated strengthening ribs 81 being column shaped.

Although a particular embodiment of the invention has been described in detail for purposes of illustration, it will be understood by one of ordinary skill in the art that numerous variations will be possible to the disclosed embodiments without going outside the scope of the invention as disclosed in the claims.

What the invention claimed is:

1. A mold assembly for manufacturing a heavy duty plastic hollow board, comprising:
   a first mold with a mold cavity on the inner surface thereof;
   a second mold aligned opposite to the first mold also having a mold cavity on its inner surface facing the first mold; and
   a movable mold associated to the outer surface of the second mold which is movable for a predetermined distance apart from the second mold and is having a plurality of protruding rib-forming members to be received by a plurality of matching through holes provided on the second mold, wherein, when the movable mold, gets relatively distant from, or alternatively, close to the second mold, the rib-forming members thereby thread through the through holes and protrude into the cavity of the second mold, or alternatively, completely isolate from said cavity wherein devices for driving the movable mold to and fro include: a linear actuator attached to the rear of the movable mold for providing a thrust to push the movable mold towards the second mold and a plurality of spring assemblies distributed over the movable mold for providing a restoring force opposite to said thrust, wherein each spring assembly includes a bolt fixedly fastened to the movable mold and receivable by the second mold, and a spring which envelops the bolt with both ends respectively butt on either the second mold or the movable mold.

2. A mold assembly for manufacturing a heavy duty plastic hollow board as claimed in claim 1 wherein the linear actuator is a cylinder with a shaft thereof fixed on a back bracket which is settled on the rear the second mold.

3. A mold assembly for manufacturing a heavy duty plastic hollow board as claimed in claim 1 wherein the second mold further comprises a back-through for detachably receiving said movable mold, wherein the peripheral contacting surfaces of the movable mold and back-through have either notches or coupling salients to be engaged mutually.

4. A mold assembly for manufacturing a heavy duty plastic hollow board as claimed in claim 1 wherein the rib-forming members are detachably attached to the movable mold.

5. A mold assembly for manufacturing a heavy duty plastic hollow board as claimed in claim 4, wherein each rib-forming member comprises a socket screwed on the surface of the movable mold and an inserting piece mounted on the socket, wherein the inserting pieces appear in the cavities of the first and second molds when the movable mold is combined with the second mold.

6. A mold assembly for manufacturing a heavy duty plastic hollow board as claimed in claim 4, wherein each through hole of the second mold comprises a socket seat and an inserting piece hole to receive the socket and inserting piece respectively.

7. A mold assembly for manufacturing a heavy duty plastic hollow board as claimed in claim 4, wherein the inserting pieces are board-shaped.

8. A mold assembly for manufacturing a heavy duty plastic hollow board as claimed in claim 4, wherein the inserting pieces are column-shaped.

* * * * *